United States Patent [19]

Giglia et al.

[11] 4,375,318
[45] * Mar. 1, 1983

[54] ELECTROCHROMIC CELLS WITH IMPROVED ELECTROLYTE SYSTEM

[75] Inventors: Robert D. Giglia, Rye, N.Y.; Sun Y. Huang, Stamford, Conn.

[73] Assignee: American Cyanamid Company, Stamford, Conn.

[*] Notice: The portion of the term of this patent subsequent to Jun. 22, 1999, has been disclaimed.

[21] Appl. No.: 173,783

[22] Filed: Jul. 30, 1980

Related U.S. Application Data

[63] Continuation-in-part of Ser. No. 70,753, Aug. 30, 1979, Pat. No. 4,335,938.

[51] Int. Cl.$^3$ ............................................. G02F 1/17
[52] U.S. Cl. ............................................. 350/357
[58] Field of Search .................. 350/357; 252/408 EC

[56] References Cited

U.S. PATENT DOCUMENTS

| | | | |
|---|---|---|---|
| 3,971,624 | 7/1976 | Bruesch | 350/357 |
| 4,116,545 | 9/1978 | Reddy | 350/357 |
| 4,116,546 | 9/1978 | Leibowitz | 350/357 |
| 4,120,568 | 10/1978 | Deb et al. | 350/357 |
| 4,174,152 | 11/1979 | Giglia et al. | 350/357 |
| 4,175,838 | 11/1979 | Randin | 350/357 |

FOREIGN PATENT DOCUMENTS 2,603,200 8/1976 Fed. Rep. of Germany ...... 350/357

*Primary Examiner*—James W. Davie
*Attorney, Agent, or Firm*—Gordon L. Hart

[57] ABSTRACT

Electrochromic devices are described having a layer of electrochromic material, e.g. $WO_3$, in contact with a layer of organic electrolyte resin, with electrode means for changing electrochromic properties of the device by electric field means. The electrolyte resin layer comprises a hydrophilic layer of homopolymer of poly(2-acrylamido-2-methylpropanesulfonic acid) with an organic humectant and in some preferred embodiments may further comprise a thinner layer of less hydrophilic electrolyte resin between the homopolymer and electrochromic layers.

5 Claims, 5 Drawing Figures

ELECTROCHROMIC CELLS WITH IMPROVED ELECTROLYTE SYSTEM

This is a continuation-in-part of our application, Ser. No. 070,753, filed Aug. 30, 1979, now U.S. Pat. No. 4,335,938, for Electrochromic Cells With Improved Electrolyte System.

The device described in our earlier application are improved by the presence of a humectant in the hydrophillic polymer of the current-carrier-permeable layer of the devices described in our earlier application. In devices described having several polymeric, ion-conducting layers, one being more hydrophilic and one or two being less hydrophilic we include a humectant in the more hydrophilic layer. The preferred humectants for this use are hydrophilic polyethylene glycols or polyethylene oxides. Other organic humectants such as glycerol, tetraethylene glycol and other hydroxy-terminated polyalkylene oxides are also suitable. The humectant is incorporated as a dispersed ingredient with the selected hydrophilic polymers in the same hydrophilic layer of the device, in an amount from about 2% to about 25% of the weight of the hydrophilic polymer in the same layer. We prefer to use from about 5% to about 10%, by weight, same basis, of the humectant.

The invention relates to improvements in persistent electrochromic display devices. More particularly the invention relates to electrochromic devices which comprise an improved current-carrier-permeable layer in ion-conductive contact with a layer of persistent electrochromic inorganic oxide, usually tungsten oxide. Both of said layers are disposed between electrode layers of opposite polarity with means for alternately applying electric fields of opposite polarity across said electrodes to change the coloration in the electrochromic layer.

Early electrochromic devices of the kind to which the invention relates were described in U.S. Pat. No. 3,521,941, patented July 28, 1970 to Deb and Shaw. A number of improvements have since been described in various patents and other literature. A principal use of electrochromic devices is for making alpha numeric or other display panels, used for example in devices such as electronic calculators, timepieces and the like. For this use the electrochromic display has the advantage that the display image, once formed, will persist for a prolonged period after the activating voltage has been removed. The electrochromic image formed in the electrochromic layer is erasable by reversing the polarity of the electric field that was used to form the image. In a display panel for an electronic device the speed of operation and the stability of the display element are both important and the present invention is directed particularly to providing devices with polymeric current-carrier-permeable layers which have the combination off adequate speed and long-life stability, both adequate for use in displays for electronic devices.

The German Pat. No. 2,603,200 described the use of an acid polymer layer, particularly polystyrene sulfonic acid, for the ion-conductive insulating layer in an electrochromic display device. Other ion-exchange resin layers have since been described for this use.

A copending U.S. patent application Ser. No. 877,139 filed Feb. 13, 1978 by Giglia, Sedlak and Lipp now U.S. Pat. No. 4,174,152 described electrochromic devices in which the current-carrier-permeable insulating layer was described as an ion-conductive, hydrophilic, clear vinyl polymer electrolyte which comprises a copolymer or partially cross-linked copolymer of 95 percent to 20 percent by weight of a vinyl monomer selected from 2-hydroxyalkyl acrylates or methacrylates and 5 percent to 80 percent by weight of an acid-group-containing, monoethylenically unsaturated monomer.

The copolymers described by the aforesaid copending application were sufficiently hydrophilic to be adequately ion-conductive to function as electrolyte layers (current-carrier-permeable layers) in electrochromic devices for some uses. But a layer of a homopolymer of the acid-group-containing monomer will be substantially more hydrophilic and hence will have improved ionic conductivity, which in turn will improve the switching speed of the electrochromic device.

In one of the preferred copolymers that was described for this use, the monoethylenically unsaturated comonomer having an acid functional group was 2-acrylamido-2-methylpropane sulfonic acid (AMPS).

An electrochromic device in accordance with the present invention comprises an ion-conductive layer which comprises a homopolymer of 2-acrylamido-2-methylpropane sulfonic acid with a small amount of water as needed to enhance ionic conductivity.

The invention may be further understood by reference to the drawings in which

Figure 1:
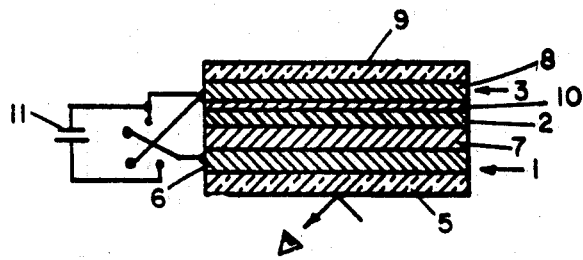
FIG. 1 is a cross section of the electrochromic display device.
Figure 3:
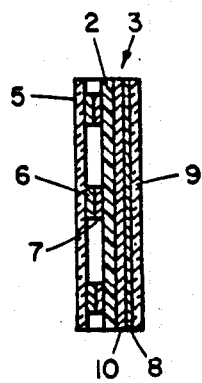
FIG. 3 is a cross sectional view of the segment of FIG. 2, taken along the lines A—A.
Figure 2:
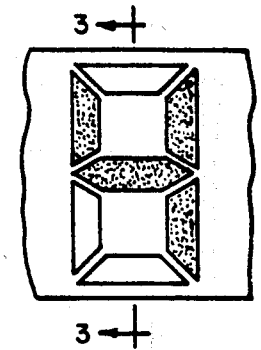
FIG. 2 is a front view of a single digital segment in an electrochromic digital display.
Figure 4:
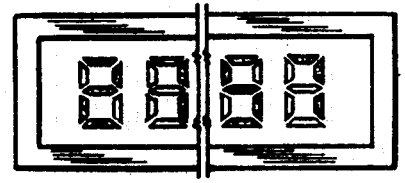
FIG. 4 is a front view of a linear digital display embodying the invention.

Shown in FIG. 1 is a conventional electrochromic (EC) information display having a transparent EC electrode 1, a pigmented, ion-conducting medium layer 2 and an opaque counter electrode 3. Layer 2 comprises a self-supporting layer of conductive polymer having a pigment dispersed therein. The EC electrode forms the viewing surface and has a transparent or translucent substrate 5, e.g. glass with a conductive layer 6, e.g. tin oxide, and an electrochromic layer 7. The counter-electrode 3 may comprise a conductive substrate, which may be a metal sheet or a glass substrate 9 with a conductive layer 8 and a layer of counter-electrode material 10 such as carbon, tungsten oxide or the like. A direct current power source such as a battery 11 is connected to make the counter-electrode negative for coloring the electrochromic layer 7 or positive to erase or bleach the same layer 7. FIGS. 2, 3 and 4 illustrate electrochromic devices in which the EC layer 7 is segmented and each segment can be individually actuated to display numerals. In FIG. 2 segments are colored to display a numeral 4.

Figure 5:
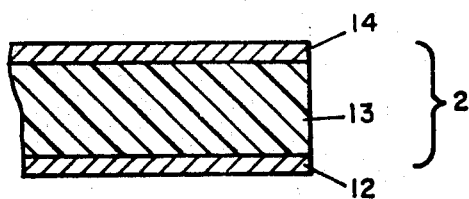
FIG. 5 is a cross section of the conductive layer showing interposed layers of less hydrophilic resins in accordance with some embodiments of the invention.

FIG. 5 illustrates a preferred conductive layer 2 which comprises a relatively thick inner layer 13 of homopolymer resin containing pigment and two thinner outer layers, 14, 15 of copolymer resin.

In some of the devices embodying the invention the AMPS homopolymer layer is the only ion-conductive resin layer in the device. In other devices the AMPS homopolymer layer is used in combination with a second layer of a less hydrophilic, and hence less ion-conductive ion-exchange resin layer, preferably a copolymer of the kind described above in which AMPS or other acid-group-containing monomer is copolymerized with a less hydrophilic comonomer.

The AMPS homopolymers have certain advantages for this use in electrochromic devices over the copolymers in which AMPS monomer is copolymerized with less hydrophilic comonomers. The homopolymer has a greater proportion of the hydrophilic acid-group-containing units and thus retains water better than the copolymers. This retained water, and the acidic moiety of the homopolymer, make the homopolymer layer a much better conductor for ions, particularly protons. The higher ionic conductivity of the homopolymer makes the electrochromic device operate faster at a given low voltage. The electrochromic devices are preferably operated at low voltage, e.g. one volt, to minimize electrolysis effects in the device. At such low voltage the speed of coloration or bleaching in the electrochromic layer is a function of the conductivity of the polymer electrolyte layer. To obtain speed sufficient for the requirements of electrochromic numeral displays, and particularly when such displays are used in timepieces, the use of AMPS homopolymer was found to be of a definite advantage over the use of copolymers that were described in the earlier application mentioned above.

Thus, in accordance with the invention, AMPS homopolymer is prepared as described in detail in the following examples.

AMPS monomer (2-acrylamido-2-methylpropane sulfonic acid) is a white crystalline solid which is available from Lubrizol Corp. of Wickliffe, Ohio. The monomer may be polymerized by several methods to form a strong-acid polymer which has properties uniquely suited to use as an ion conductor in electrochromic devices. Examples of polymerization methods include:

EXAMPLE 1

Ten grams of AMPS monomer and 90 grams of deionized water were charged into a three-neck 250 ml flask having a magnetic stirrer, nitrogen gas inlet and outlet through a reflux condenser and flask heating by silicone oil bath. The reaction mixtures were sparged with nitrogen and heated to 65° C. One-tenth gram of succinic acid peroxide was added. The reaction time was three hours. Finally, the mixture was cooled to 25° C. and had a Brookfield viscosity reading of approximately 28 cps.

EXAMPLE 2

10 Grams of 2-acrylamido-2-methylpropane sulfonic acid monomer, 10 grams of methanol and 80 grams of deionized water were charged to a three-neck 250 ml flask. The procedure was the same as Example 1 and the Brookfield viscosity was 48 cps.

EXAMPLE 3

10 Grams of AMPS monomer, 20 grams of methanol and 70 grams of deionized water were charged to the flask and the procedure followed as in Example 1. The Brookfield viscosity reading was 20 cps.

EXAMPLE 4

18 Grams of AMPS monomer, 20 grams of ethanol and 20 grams of deionized water were processed in a three-neck 250 ml flask as in Example 1 except the succinic acid peroxide was replaced by 0.2 gram of 2,2'-azobisisobutyronitrile. The reaction mixture had a Brookfield viscosity reading of 490 cps.

EXAMPLE 5

18 Grams of AMPS monomer, 15 grams of deionized water and 25 grams of ethanol were charged into the three neck flask and the procedure was the same as in Example 4 except 0.28 gram of Vazo 64 was used. The Brookfield viscosity was 230 cps.

EXAMPLE 6

30 Grams of AMPS monomer, 67.5 grams of DMF were charged into the three-neck flask and reacted as in Example 1 except the succinic acid peroxide was replaced with 0.5 gram of 2,2'-azobisisobutyronitrile. The Brookfield viscosity was 1700 cps.

Any of these homopolymers may be used in an electrochromic device in a manner illustrated by the following examples:

EXAMPLE 7

The polymer solution of Example 1 was freeze dried to a dry solid resin then 4 grams of the dry polymer was mixed with 16 gram of dimethyl formamide (DMF) solvent and 0.4 gram of American Cyanamid Company OR 450 $TiO_2$ pigment to make a thick paint consistency. An electrochromic, sevensegment numeral display was deposited by thermal evaporation of $WO_3$ in vacuum on to a Nesa glass substrate. The tungsten oxide layer thickness was $0.36\mu$. A 0.5 mm thick plastic spacer ring was epoxy bonded around the numeral, to the Nesa glass substrate using Devcon "five minute epoxy" to cement the ring. The pigmented resin solution was coated over the $WO_3$ numeral to fill the cavity inside the spacer ring. The polymer layer was dried by heating to 70° C. for 16 hours. Next, the dried solid polymer layer was exposed to air containing 80 percent relative humidity at 25° C. for ½ hour to add the small amount of water to the resin as needed to enhance ionic conductivity. An electrically conductive paper counter-electrode 0.35 mm thick, of the kind described in U.S. Pat. No. 4,088,395, Example No. 1, was cut to the shape of the outside edge of the spacer ring and was pressed over the surface of the polymer layer and the spacer ring. Next, a graphite coated, stainless steel plate was pressed against the paper counter-electrode and the edges of the device were sealed with epoxy cement. The device was operated in cycles by applying 1.25 volt D.C. for 0.9 sec., with the electrode bearing the electrochromic numeral negative to color the numeric image, and by alternately applying 1.0 volt D.C. for 0.9 sec. with the counter-electrode negative to erase the numeric image. Under those switching cycle conditions, the depth of coloration was very good, up to 60 percent contrast, and there was no indication of device degradation observed after cycling for 24 hours.

EXAMPLE 8

The polymer solution prepared in Example 6 was used to prepare an electrochromic mirror 14 $cm^2$ in area. A $WO_3$ layer $1.2\mu$ thick was deposited upon a conductive glass substrate by thermal evaporation in vacuum. Next a palladium layer 450 Å thick was deposited upon the $WO_3$ layer also by thermal evaporation in vacuum. The polymer solution of Example 6 was spin coated on to the palladium layer to produce a dry polymer thickness of about $10\mu$. The film was heated to 70° C. for ½ hour then stored in air at 80 percent relative humidity at 25° C. for another ½ hour. A paper counter-electrode 0.35 mm thick as described in U.S. Pat. No. 4,088,395 Example No. 1 was cut to size and roll liminated into the polymer surface. A plate of conductive indium oxide coated glass was pressed against the paper counter-electrode. The mirror was darkened by coloration of the WO$_3$ layer, by applying 1.0 volt D.C., with the electrode bearing the electrochromic layer negative. The coloration cleared when 1.0 volt was applied with reverse polarity.

Numeric displays made using the homopolymer of 2-acrylamido-2-methylpropane sulfonic acid, as described in Example 7 above, on test were found to have the required ionic conductivity for rapid switching, e.g. one second or less to full color or to full erase, and the devices on test were found suitable for use over long periods under constant switching conditions, simulating use over the lifetime of a timepiece. Some of the devices made with a layer of poly(2-acrylamido-2-methylpropane sulfonic acid) as described above may exhibit a tendency to develop unwanted residual coloration in the electrochromic film after thousands of cycles of switching from colored to clear state. The residual coloration is usually only slight and will not in most uses impair the utility of the display, but it is an esthetic imperfection which can be eliminated by the further improvement described below.

The residual coloration noted above results from the exposure of the tungsten oxide electrochromic layer to the small amount of water that is retained in the hydrophilic homopolymer layer. While this retained water is beneficial for the ionic conductivity of the homopolymer layer, it tends to migrate to the adjacent electrochromic layer where it causes hydration of the WO$_3$ and the consequent residual coloration. We have overcome this problem by using a two-component ion-conductive polymer layer. One of the two components is a homopolymer electrolyte layer of the kind described above and the other component is a much thinner electrolyte layer made of a less hydrophilic resin, interposed between the homopolymer layer and the electrochromic layer. This interposed layer has some proton conductivity, and will usually contain some water, though not in as high a proportion as the homopolymer layer. We may use one of the copolymers of 2-acrylamido-2-methylpropane sulfonic acid with a vinyl comonomer of 2-hydroxy alkyl acrylate or methacrylate and preferably such a copolymer that is partially cross-linked, as the material for the thinner less hydrophilic component layer. The interposed copolymer layer, being less hydrophilic, can shield the tungsten oxide layer from the higher water content of the homopolymer layer. By using only a very thin layer of the less conductive copolymer we avoid unduly restricting the ionic conductivity of the two-component layer. This thinner component layer is of thickness in the range from about 1 to about 50 microns. The more ion-conductive and more hydrophilic resin layer is of thickness in the range from about 300 to about 1000 microns. When a pigment is used for visual contrast in the device, we prefer to incorporate the pigment in the thicker component layer.

EXAMPLE 9

A copolymer of AMPS, 2-hydroxyethyl methacrylate, partially cross-linked was prepared by adding 3.25 gram of 2-acrylamido-2-methylpropane sulfonic acid monomer, 4.9 gram of 2-hydroxyethyl methacrylate monomer, 0.02 gram of ethylene glycol dimethacrylate, 0.5 gram of glycidyl methacrylate, 29.2 gram of ethanol, 19.8 gram of methanol and 2.7 gram of water and 0.06 gram of azobisisobutyronitrile to a flask equipped with an agitator, heating oil bath, nitrogen gas inlet and outlet through a reflux condenser. The flask contents were sparged with nitrogen and stirred under nitrogen at 60° C. for 16 hours. The product, a copolymer solution, was ready for use after cooling to room temperature.

A homopolymer of AMPS was made by adding 180 gram 2-acrylamido-2-methylpropane sulfonic acid monomer, 200 gram of ethanol, 200 gram of deionized water and 2 gram or 2,2'-azobisisobutyronitrile (Vazo 64) to a flask equipped with an agitator, heating oil bath, nitrogen gas inlet and outlet through a reflux condenser. The flask contents were sparged with nitrogen and stirred under nitrogen at 60° C. for 16 hours. The product, a homopolymer solution, was filtered and freeze dried. Next, 18 g of the dried homopolymer, 2 gram of TiO$_2$ pigment, 7.4 ml water, 36 ml of ethanol and 0.06 gram of Union Carbide L-5310 silicone surfactant were added to a ball mill and milled for approximately 12 hours to form a pigmented mixture.

An electrochromic layer approximately 0.3 m was formed on a first electrode by thermal evaporation of tungsten oxide (WO$_3$) in a vacuum on a transparent, conducting substrate of Nesa glass. The layer was deposited through a mask in a pattern of four, seven-segment numerals, 13 mm high. A 0.3 mm thick Mylar spacer ring was bonded with epoxy cement to the Nesa glass surface around the numeral pattern. A 1–10$\mu$ thick layer of the copolymer described above was deposited on to the first electrode over the numeral pattern, by conventional spin-coating methods. The layer was heated to 70° C. for 12 hours to remove solvents and produce cross-linking. The pigmented homopolymer mixture was poured in to fill the cavity of the 300$\mu$ thick ring and partially dried in a nitrogen atmosphere at 75 percent relative humidity at 25° C. A paper-carbon counterelectrode sheet of the type described in U.S. Pat. No. 4,088,395 was placed upon the surface of the electrolyte and pressed in place. A second conductive tin oxide glass was pressed against the paper electrode and an edge seal was made with epoxy, completing the assembly of the device.

The device was operated at room temperature by applying a D.C. potential of 1.0 volt between the electrodes. With the electrode bearing the electrochromic numeral pattern negative, the EC layer colored producing about 60 percent contrast in 0.9 second. The polarity was reversed and the image was erased in less than 0.9 second. The device was switched back and forth, alternately coloring and erasing the electrochromic image for more than $3 \times 10^6$ cycles at 25° C. without any noticeable gain in residual contrast.

EXAMPLE 10

A copolymer was prepared by adding 40 gram of 2-hydroxyethyl methacrylate, 0.4 gram of ethylene glycol dimethacrylate, 160 gram of ethanol, 0.4 gram of azobisiso butyronitrile (Vazo 64), to a flask equipped with an agitator. The mixture was agitated at 65° C. under nitrogen for 17 hours. The reaction mixture was cooled to 25° C. and by standing without agitation separated into two layers. The bottom layer of liquid polymer was isolated and used to make the thin electrolyte layer in a device otherwise the same as that described in Example 9. The device was operated for more than $1.5 \times 10^6$ switching cycles without a noticeable gain in residual contrast.

EXAMPLE 11

An electrochromic information display was made as in Example 9 except:

The thicker homopolymer layer was dried at 65 percent relative humidity and 25° C. A thin layer of the copolymer was coated on one side of the paper-carbon counterelectrode. The coated paper was heated at 70° C. for 12 hours, cooled to 25° C. and pressed with the coated side against the homopolymer layer. The device was operated for more than $3 \times 10^6$ cycles without a noticeable gain in residual contrast. Furthermore, the coating of the paper electrode was found to stabilize and prevent swelling of the paper electrode. Such swelling had caused non-uniform background color in other constructions.

EXAMPLE 12

A copolymer electrolyte was prepared as in Example 9. A homopolymer electrolyte was prepared through the freeze drying step in Example 9. Next, 27 grams of the dried homopolymer, 3 grams of $TiO_2$ pigment (OR 450), 40 grams of deionized water and 0.075 gram of Union Carbide L-5310 silicone surfactant were added to a ball mill and milled for approximately 24 hours.

An electrochromic layer approximately $0.15\mu$ thick was formed on a first electrode by thermal evaporation of tungsten oxide ($WO_3$) in a vacuum on to a transparent, conducting substrate of Nesa glass. The layer was deposited through a flask in a pattern of four, seven-segment numerals, 13 mm high. A 0.3 mm thick Mylar spacer ring was bonded to the first electrode with epoxy to form an electrolyte cavity. A $1\mu$–$10\mu$ thick layer of the first electrolyte was deposited on to the first electrode using conventional spin-coating methods. The layer was heated to 70° C. for 12 hours to remove solvents and produce cross-linking. As in Example 11 the paper counter-electrode was treated with the first electrolyte. Subsequent assembly operations were accomplished in a nitrogen atmosphere so as to exclude oxygen and improve device memory in the colored state.

The pigmented, second electrolyte was poured into the cavity formed by the spacer ring and dried under a jet of dry nitrogen gas. Next the polymer electrolyte was humidified for 24 hours at 65 percent relative humidity and 25° C. in nitrogen and the paper counter-electrode was roll laminated in place. A second Nesa glass electrode was pressed on to the paper counter-electrode and an edge seal was made with epoxy completing the assembly of the device. The device was operated as in Example 9 for more than $2.5 \times 10^6$ cycles without any evidence of degradation or gain in residual coloration.

The invention may comprise other variations and modifications which may not have been described in detail in the foregoing examples. The most preferred material for the persistent electrochromic layer in a device embodying the invention usually will be electrochromic tungsten oxide, but the invention may comprise devices made with electrochromic layers of other inorganic compounds, such as transition metal oxides or halides, tellurides, molybdates, tungstates, niobates, tantalates, titanates, stannates, and other inorganic, oxygen containing compounds having the electrochromic property in thin layers, as described with more particularity in U.S. Pat. No. 3,521,941.

The homopolymers of 2-acrylamidomethyl propane sulfonic acid may be varied in molecular weight, as illustrated by Examples 1–6 above, and any of those or other homopolymers of this monomer may be used for making electrolyte layers in a device of the invention.

When the homopolymer is used in combination with one or two thinner layers of a less hydrophilic ion conductive material, we prefer to use a copolymer of 95 to 20 percent by weight of a 2-hydroxyalkyl acrylate or methacrylate and 5 to 80 wt percent of an acid-group-containing comonomer, which may be partially cross-linked, as described in more detail in U.S. Pat. No. 4,174,152.

The thinner, less hydrophilic, ion conductive layers may also be of another polymer having the requisite properties of relatively less hydrophilic tendency than the homopolymer layer and some degree of ionic conductivity.

The device of the invention may also be varied by incorporation of other functional layers in the device, such as a second electrochromic layers on the counter-electrode, or any of various other non-electrochromic layers in the device for particular functions, and the like.

The device may be varied by substituting other materials for the electrodes, such as other electronically conductive sheets, plates and the like.

In the following examples, humectants are added in the poly-amps layer to improve the performance of the devices by reducing residual contrast.

EXAMPLE 13

A liquid electrolyte formulation was prepared as follows:

18 g Poly-AMPS (Freeze Dried)
2 g $TiO_2$ Pigment (Cyanamid OR-450)
25 g Water, Deionized
0.9 g Polyethylene Glycol (U.S. Carbowax 1000)

The mixture was ball milled in a jar for 48 hours and used to cast an electrolyte layer on an EC electrode comprising 5 mm high $WO_3$ numberic shaped film on NESA glass. The film was dried to a solid, the rehumidified for ½ hour at 80 percent RH. The exposed surface of the polymer element became soft and adhesive. A paper counter-electrode was pressed against the polymer layer and roll laminated in place. A plate of NESA glass was pressed against the paper electrode and an edge seal was made with epoxy. The device was tested at about 22° C. by electrically switching to color and clear at 0.5 Hz frequency and a maximum of 1 volt D.C. applied. $1 \times 10^7$ cycles passed without a significant increase in residual contrast.

EXAMPLE 14

Formulation:
27 g Poly-AMPS (Freeze-Dried)
3 g $TiO_2$ Pigment (Cyanamid OR-450)
37 g Water, Deionized
2.7 g Polyethylene Oxide (M.W. 100,000)

Devices were prepared using the Example 14 formula and cycle life tested at 22° C. and 50° C. No gain in residual contrast is observed after $1 \times 10^6$ cycles.

EXAMPLE 15

The formulation was as in Example 14 except the molecular weight of the polyethylene oxide was 900,000. There was no gain in residual contrast after $1 \times 10^6$ cycles.

We claim:

1. In an electrochromic device comprising a polymeric current-carrier-permeable layer in ion-conductive contact with a layer of persistent electrochromic inorganic oxide with both of said layers disposed between electrode layers and means for alternately applying electric fields of opposite polarity across said electrodes for changing the coloration in said electrochromic layer, the improvement wherein said current-carrier-permeable layer comprises a layer of polymeric electrolyte consisting of poly(2-acrylamido-2-methylpropanesulfonic acid) homopolymer and with an added organic humectant.

2. An improved device defined by claim 1 wherein the organic humectant is polyethylene glycol.

3. An improved device defined by claim 1 wherein the organic humectant is polyethylene oxide.

4. An improved device defined by claim 1 wherein the organic humectant is polyethylene oxide having a molecular weight of 100,000.

5. An improved device defined by claim 1 wherein the organic humectant is polyethylene oxide having a molecular weight of 900,000.

* * * * *